Feb. 13, 1951                  L. GATES                  2,541,815
MATERIAL CONVEYING SHOVEL BOOM UNIT
Filed July 13, 1949                              5 Sheets—Sheet 1
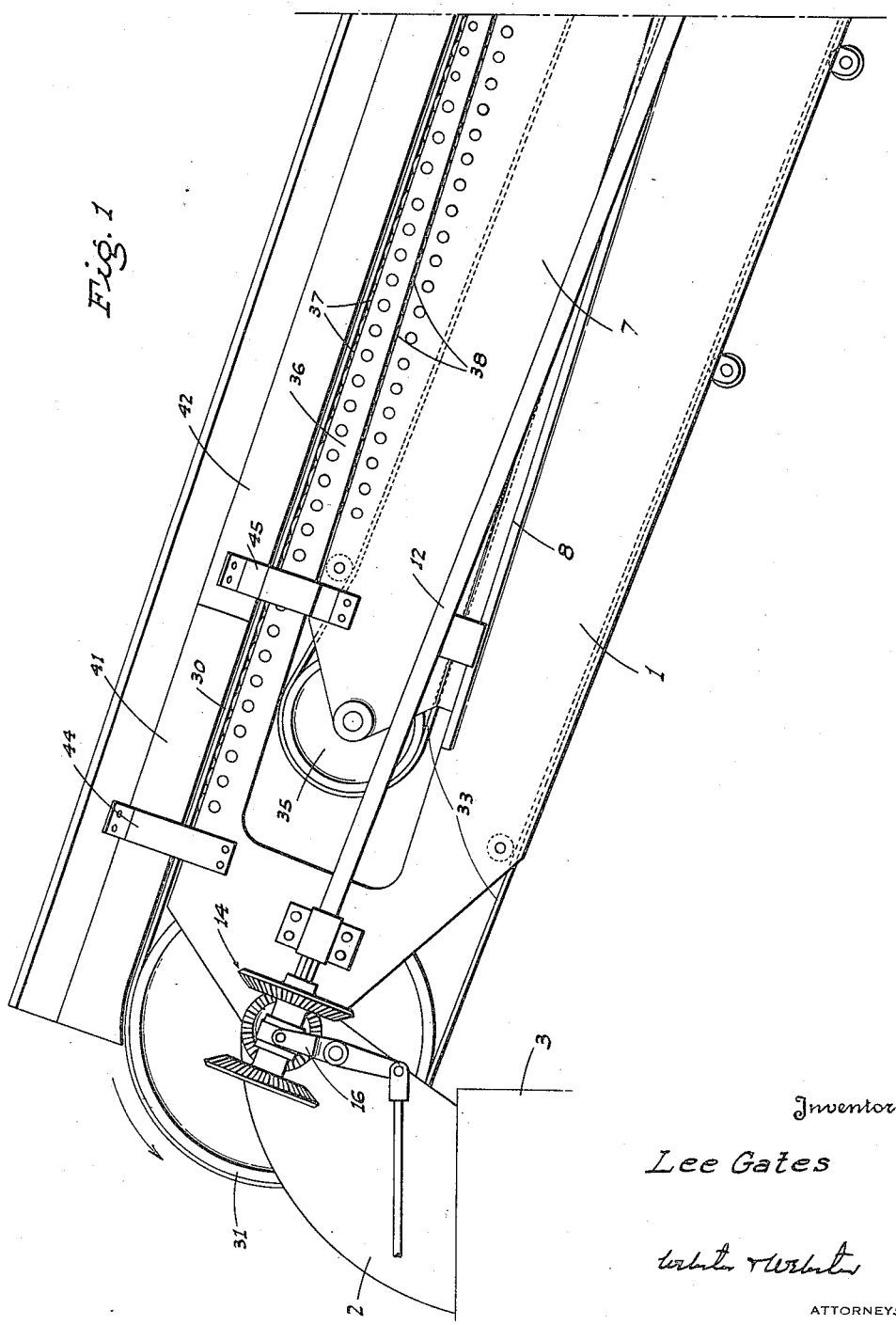
Inventor
*Lee Gates*
ATTORNEYS

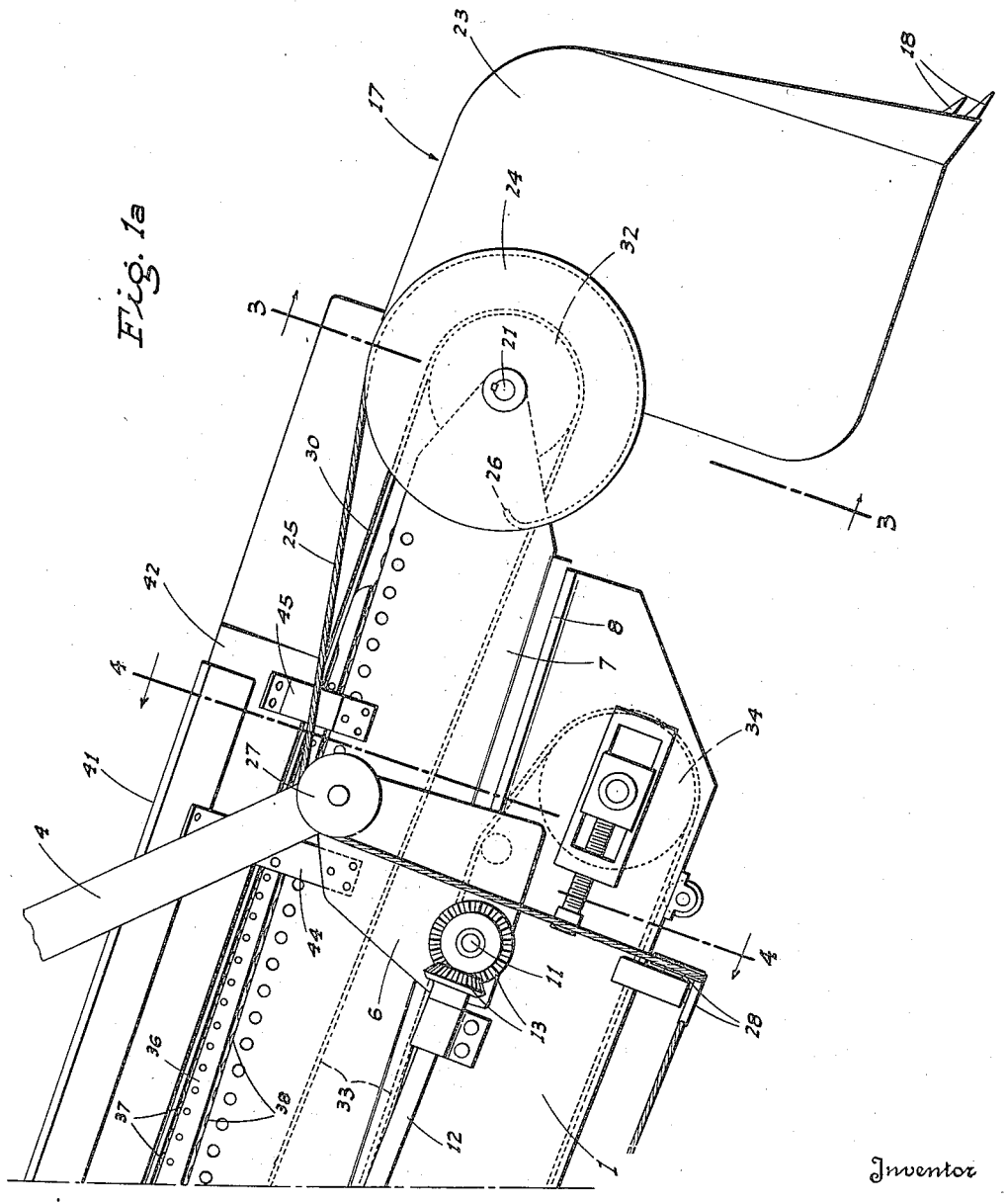

Feb. 13, 1951 — L. GATES — 2,541,815
MATERIAL CONVEYING SHOVEL BOOM UNIT
Filed July 13, 1949 — 5 Sheets-Sheet 3

Inventor
Lee Gates

By

ATTORNEYS

Feb. 13, 1951             L. GATES             2,541,815
MATERIAL CONVEYING SHOVEL BOOM UNIT
Filed July 13, 1949             5 Sheets-Sheet 4
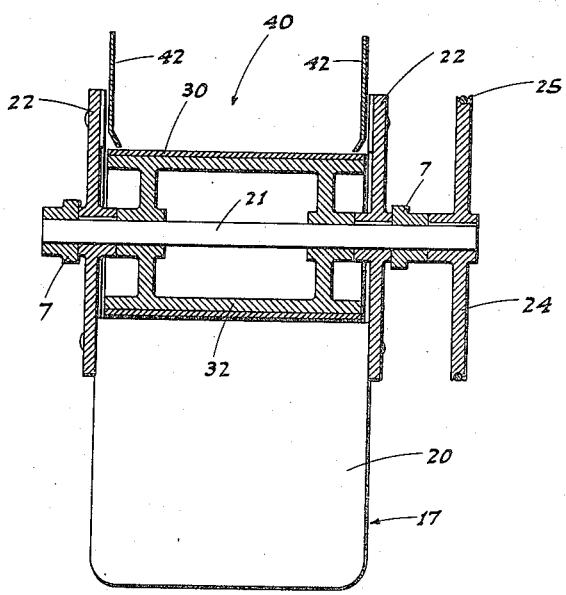
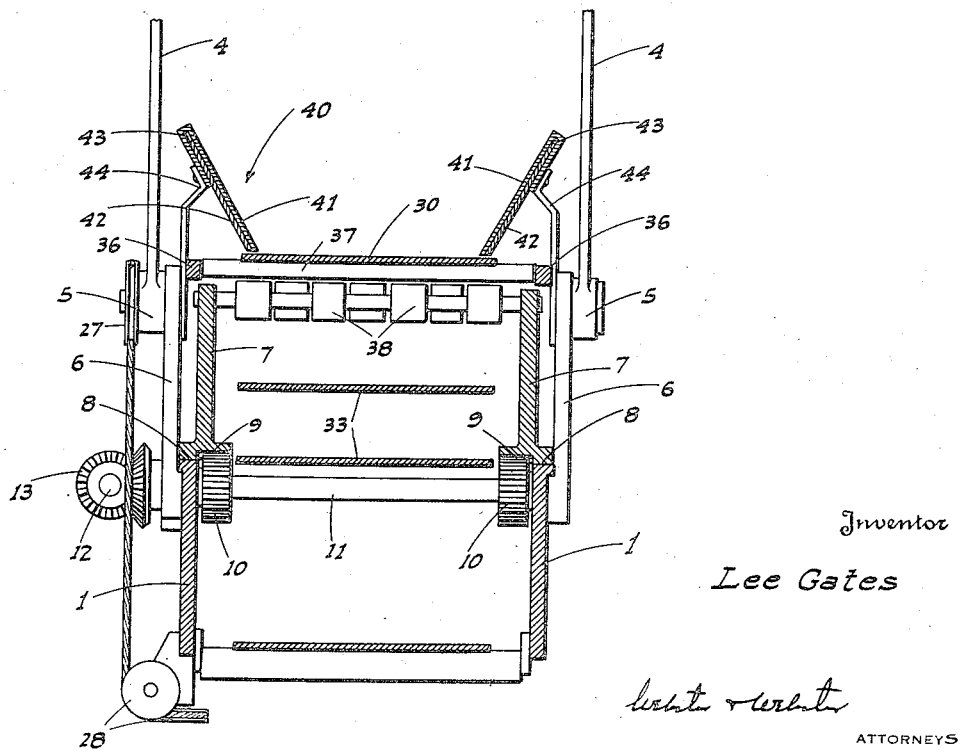
Inventor
Lee Gates
ATTORNEYS Feb. 13, 1951  L. GATES  2,541,815
MATERIAL CONVEYING SHOVEL BOOM UNIT
Filed July 13, 1949  5 Sheets-Sheet 5
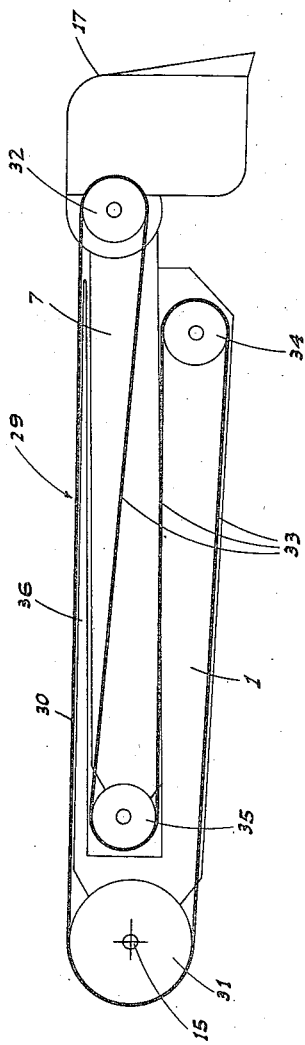
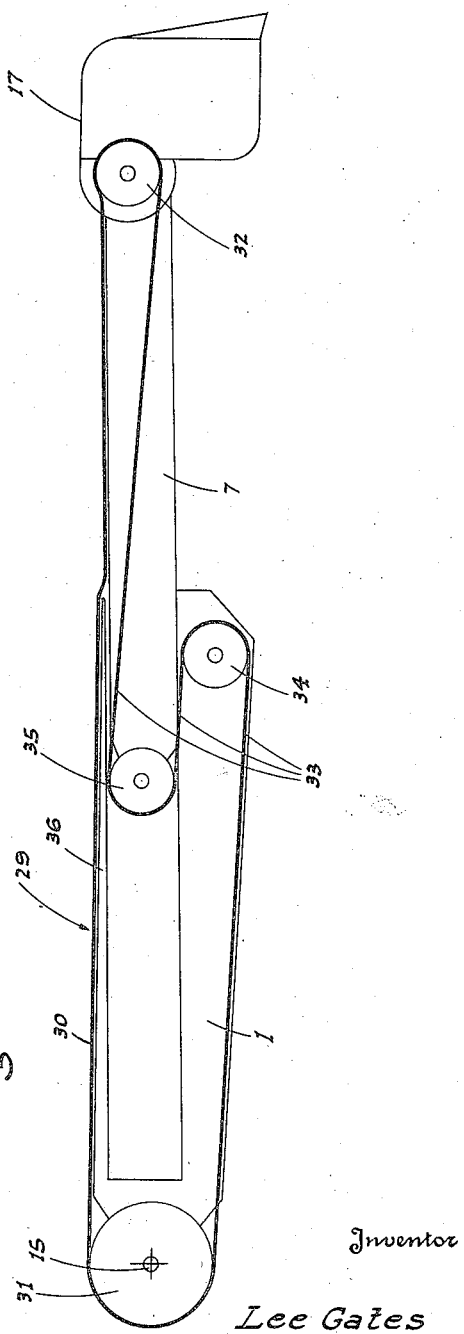
Inventor
Lee Gates
By
ATTORNEYS Patented Feb. 13, 1951

2,541,815

UNITED STATES PATENT OFFICE 2,541,815

MATERIAL CONVEYING SHOVEL BOOM UNIT

Lee Gates, El Cerrito, Calif.

Application July 13, 1949, Serial No. 104,540

3 Claims. (Cl. 214—90)

This invention is directed to, and it is an object to provide, a novel digging bucket supporting boom unit for a power shovel or the like; such boom unit including a conveyor adapted to receive material from the bucket and to then convey such material to a rearward point for carry-off, thus avoiding the usual lateral swinging of the boom unit to dump the bucket clear of the digging area.

Another object of the invention is to provide a material conveying boom unit, as above, which is adjustable in length; the material conveyor being extensible so as to work effectively at all times between a material receiving point at the front of the boom unit and a material discharge point at the rear thereof; such conveyor being an endless belt having novel reeving to compensate for adjustment in the effective length of said boom unit.

An additional object of the invention is to provide a material conveying boom unit, including a conveyor as in the preceding paragraph, wherein the material is carried rearwardly on an extensible upper run of said conveyor; there being extensible trough sides associated with the conveyor to prevent lateral spillage of material regardless of the extent of longitudinal adjustment of the boom.

A further object of the invention is to provide novel power actuated mechanisms for longitudinally adjusting the boom, and for tilting the bucket to dump regardless of the extent of boom adjustment; such mechanisms being adapted for control by the operator of the power shovel.

It is also an object of the invention to provide a material conveying boom unit designed for ready and convenient manufacture; the boom unit being sturdy and very satisfactory in use.

A further object of the invention is to provide a practical and reliable material conveying boom unit, and one which will be exceedingly effective for the purpose for which it is designed.

These objects are accomplished by means of such structure and relative arrangement of parts as will fully appear by a perusal of the following specification and claims.

In the drawings:

Figs. 1 and 1A comprise, together, a side elevation of the novel, material conveying boom unit; Fig. 1 illustrating the rear portion of the boom unit, and Fig. 1A illustrating the front portion thereof.

Fig. 3 is a cross section on line 3—3 of 1A.

Fig. 4 is a cross section on line 4—4 of Fig. 1A.

Fig. 5 is a diagrammatic side elevation of the boom unit showing the compensating reeving of the endless, material conveyor; the boom unit being in its contracted position.

Fig. 6 is a similar view, but shows the compensating reeving as when the boom unit is extended.

Figure 2:
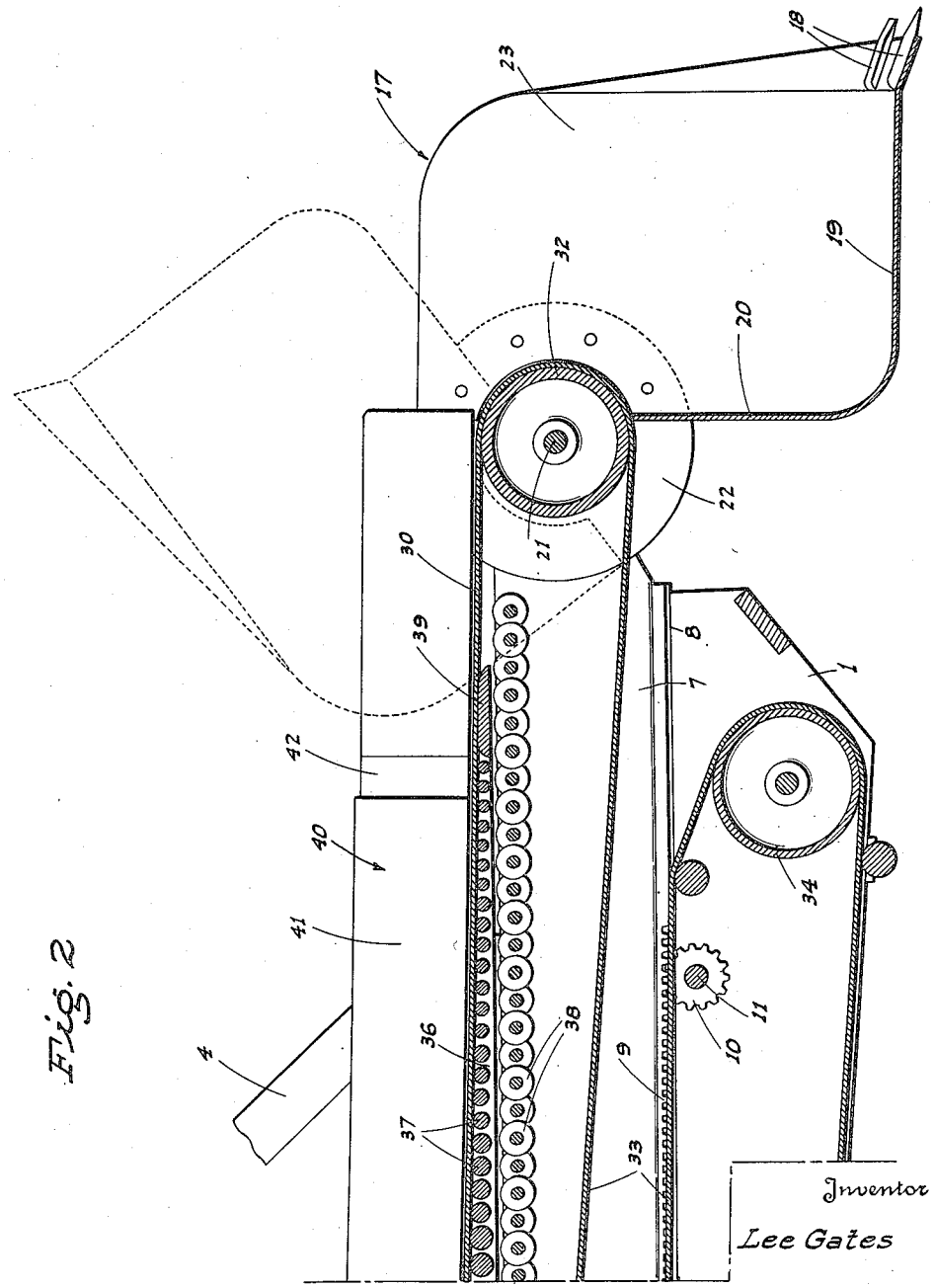
Fig. 2 is a fragmentary sectional elevation of the front portion of the boom unit.

Referring now more particularly to the characters of reference on the drawings, the boom unit comprises a main boom 1 vertically swingably mounted at its rear end in connection with spaced mounts 2 which upstand from a frame 3 on the power shovel.

The boom unit is adapted to be raised or lowered by means including a suspension yoke 4, whose legs are pivotally connected at their lower ends, as at 5, to fixed plates 6 which upstand from opposite sides of said main boom 1.

On top thereof the main boom 1 supports an extension or crowder boom 7 in longitudinally slidable relation, as at 8, whereby the effective length of the boom unit may be adjusted by sliding said extension boom 7 forwardly or rearwardly. Suitable guide and holddown devices are employed between the extension boom 7 and the main boom 1.

The following power draft mechanism is included for the purpose of sliding the extension boom 7 forwardly or rearwardly.

At the bottom thereof, and on opposite sides, the extension boom 7 is formed with downwardly facing longitudinal racks 9 which mesh with corresponding pinions 10 fixed on a cross shaft 11 journaled in connection with, and extending between the sides of, the main boom 1 adjacent the front end of the latter.

A drive shaft 12 is journaled on, and extends lengthwise of, the main boom 1 at one side thereof, and is connected at its front end, in driving relation with the cross shaft 11, by a bevel gear unit 13. At its rear end the shaft 12 is driven, through the medium of a reversing bevel gear and clutch unit 14, from a power actuated cross shaft 15 which is coaxial with the pivotal mount at the rear end of the main boom 1. The reversing bevel gear and clutch unit 14 includes a shifting fork 16 by means of which said unit may be placed in or out of operation, reversibly.

When the bevel gear and clutch unit 14 is in operation to drive the pinions 10 in one direction or the other, the extension boom 7 is either shifted forwardly or rearwardly to extend or contract the boom unit with respect to its effective length.

At the front end of the extension boom 7 the same is fitted with a digging bucket 17 open top and front, and provided at its forward lower edge with digging teeth 18. The bottom and back of the digging bucket 17 are indicated at 19 and 20, respectively.

A cross shaft 21 is journaled on the extreme forward end of the extension boom 7, and circular mounting discs 22 are keyed to said shaft in axially spaced relation; said mounting discs 22 having the normally front halves thereof fixed to the corresponding sides 23 of the bucket 17 adjacent the upper portions thereof.

The digging bucket 17 is tiltable upwardly and rearwardly from its normal position, as in full lines in Fig. 2, to a dumping position, as in dotted lines in said figure; such tilting of the bucket 17 being accomplished as follows:

The cross shaft 21 is fitted at one end, outwardly of one mounting disc 22, with a relatively large-diameter pulley 24. A dump control cable 25 is anchored, as at 26, to the pulley 24 and thence extends forwardly and upwardly about the latter, running off the top of said pulley rearwardly over a direction-changing sheave 27 on the corresponding plate 6. From the sheave 27 the dump control cable 25 extends downwardly, and thence turns about direction-changing sheaves 28 on the bottom of the main boom 1; such cable extending rearwardly from the sheaves 28 to a winch unit (not shown) on the power shovel. Upon the winch unit being actuated to pull on the cable 25, the pulley 24 and cross shaft 21 are forcefully rotated, whereby to swing the digging bucket 17 upwardly and rearwardly to dump the same.

Material as dumped from the digging bucket 17 is received and carried rearwardly by a longitudinal, endless belt conveyor, indicated generally at 29, and which is constructed and functions as follows:

The endless belt conveyor 29 comprises a flat, relatively wide endless belt 30, whose upper run extends between a driven drum 31 on the power actuated cross shaft 15 and an idler drum 32 turnable on the cross shaft 21. The cross shaft 15 is driven in a direction to cause the upper run of the endless belt 30 to travel rearwardly, whereby material dumped on the latter from the digging bucket 17 is carried rearwardly to a discharge point at the rear end of the boom unit, and from which said discharge point such material is carried away by other suitable conveyor means (not shown), which may be an elevator conveyor adapted to deliver to a truck or the like standing adjacent the power shovel.

The arrangement is such that the idler drum 32 and the portion of the endless belt 30 which turns about the same projects forwardly into the digging bucket 17 between the sides 23 thereof; this arrangement being desirable for the reason that when said digging bucket is in its rearwardly tilted position to dump, the forward portion of the upper run of the endless belt 30 projects a substantial distance into said bucket in a material receiving position (see Fig. 2). The back 20 of the bucket is open above the idler drum 32 so that the bucket may tilt rearwardly without obstruction.

The endless belt conveyor 29 is extensible to correspond to adjustments in the effective length of the boom unit, and such extension of the conveyor is accomplished by compensating reeving of the lower run of said endless belt 30, as at 33; such compensating reeving 33 extending back and forth between an idler drum 34 on the front end of the main boom 1, and another idler drum 35 on the rear end of the extension boom 7. The parts are so related that when the extension boom 7 is adjusted forwardly or rearwardly with respect to the main boom 1, with resultant lengthening or shortening of the upper run of the endless belt 30, the compensating reeving 33 maintains such upper run taut. See Figs. 5 and 6.

In order to adequately support the upper run of the endless belt 30, with a relatively heavy load thereon, the following arrangement is provided:

The main boom 1 includes a longitudinal supporting frame 36 which extends forwardly from the rear end of said main boom 1 in overhanging relation to the extension boom 7; such supporting frame 36 carrying a roller bed 37 on which rests the adjacent portion of the upper run of the endless belt 30.

Similarly, the top of the extension boom 7 is fitted with a roller bed 38, whereby when said extension boom 7 is slidably adjusted to project ahead of the main boom 1, the portion of the endless belt 30 ahead of the longitudinal supporting frame 36 is carried on the adjacent portion of said roller bed 38.

To assure of easy transfer of the upper run of the endless belt 30 from the roller bed 38 to the roller bed 37, the frame 36 is fitted. at its front end, with a transverse shoe 39 which tapers somewhat toward its forward edge. To further assure of non-abrupt travel of the upper run of the endless belt 30 from the roller bed 38 to the roller bed 37, the former inclines slightly upward in a forward direction, and the rollers of the bed 38 are decreased in diameter at the front end portion thereof.

In order to prevent lateral spillage of material from the upper run of the endless belt 30 as it travels rearwardly, the boom unit is fitted with longitudinal, transversely spaced, extensible trough sides 40. Each of said trough sides 40 includes a longitudinal side plate 41 fixed relative to the main boom 1 and a side plate 42 fixed relative to the extension boom 7; each side plate 41 having a downwardly opening channel 43 along its upper edge, and in which channel the corresponding side plate 42 runs. With this arrangement it will be recognized that as the boom unit is adjusted in effective length, the extensible trough sides 40 correspondingly adjust so that, at all times, said trough sides 40 extend from adjacent the digging bucket 17 to the rear end of said boom unit.

The side plates 41 are fixed in connection with the main boom 1 by brackets 44, while the side plates 42 are fixed in connection with the extension boom 7 by brackets 45.

With the above described boom unit, material is conveyed in an effective and practical manner from the digging bucket 17 to a discharge point at the rear end of said boom unit, thus eliminating the necessity of swinging said boom unit laterally to dump the bucket, as is conventional. By providing a unitary, material conveyor lengthwise on the boom unit, digging operations, with conveying of the material to a remote point for subsequent handling, are accomplished more readily and with greater speed.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent may be desired:

1. A material conveying boom unit, for power shovels or the like, comprising a main boom, an extension boom on the main boom adjustably projecting ahead of the latter, a digging bucket on the front end of the extension boom tiltable rearwardly to dump, means operative to tilt the bucket regardless of the adjustment of the extension boom, a transverse axis roller on the front end of the extension boom adjacent the bucket, a separate transverse axis roller on the main boom, an endless belt conveyor trained between said rollers, the upper run of the conveyor receiving material dumped from the bucket, compensating reeving between the booms of the lower run of the conveyor whereby the upper run alters in effective length in response to adjustment of the extension boom, a roller bed on the top of the extension boom adapted to support the upper run from below ahead of the main boom, the latter including a longitudinal frame above the extension boom, and another roller bed on the frame supporting said upper run rearwardly of the projecting portion of the extension boom.

2. A material conveying boom unit comprising a main boom, an extension boom, a digging bucket on the front end of the extension boom tiltable rearwardly to dump, an extensible endless belt conveyor mounted on the boom unit and having an upper run extending between a material receiving point adjacent the bucket and a discharge point adjacent the rear end of the boom unit, a longitudinal row of closely spaced rollers mounted on the main boom and supporting the portion of the upper run of the conveyor disposed thereabove, guide members on the main boom supporting the extension boom from the main boom for longitudinal movement relative thereto at a relatively slight upward incline to the plane of the top of the row of rollers in a forward direction, said rollers decreasing in diameter toward the forward end of the main boom to correspond to said incline, and a longitudinal row of rollers mounted on the extension boom in a plane immediately below the first named rollers when the extension boom is retracted and parallel to the guide members.

3. In a material-conveying boom unit, a main boom, an extension boom slidably mounted on the main boom, a bucket at the forward end of the extension boom tiltable rearwardly to dump, a pivot shaft fixed with the bucket and journaled in the extension boom, a rearwardly movable conveyor mounted on the boom unit and on to which the bucket discharges when tilted, and means to thus tilt the bucket comprising a pulley fixed on the shaft, a pull cable anchored on and normally wound about the pulley, and guide and direction changing pulleys on the main boom over which the cable passes from the top of the first named pulley to direct said cable to the rear end of the boom unit for connection to a winch.

LEE GATES.

REFERENCES CITED

The following references are of record in the file of this patent:

UNITED STATES PATENTS

| Number | Name | Date |
| --- | --- | --- |
| 1,041,603 | Dearborn | Oct. 15, 1912 |
| 1,128,880 | Jamison | Feb. 16, 1915 |
| 1,260,683 | Keast | Mar. 26 1918 |
| 1,321,531 | Mainerre | Nov. 11, 1919 |
| 2,086,573 | Osgood | July 13, 1937 |
| 2,169,890 | Zink | Aug. 15, 1939 |
| 2,439,912 | Stoltz | Apr. 20, 1948 |